3,639,505
POLYOLEFIN FIBERS OF IMPROVED DYE RECEP-
TIVITY CONTAINING TOLUENESULFONAMIDES
James K. Hughes and Tsung-Yuan Su, Bartlesville, Okla.,
assignors to Phillips Petroleum Company
No Drawing. Filed May 11, 1970, Ser. No. 36,393
Int. Cl. C08f 29/10
U.S. Cl. 260—873                                  16 Claims

ABSTRACT OF THE DISCLOSURE

The dyeability of polyolefin fibers and films is improved by forming a polymer alloy comprising an intimate blend of polyolefin, a minor amount of polyethylene terephthalate and from 0.2 to 5 parts per hundred parts of polymer of toluenesulfonamide compound. Shaped objects prepared from such blends have improved receptivity to disperse dyes.

---

The present invention relates to chemical compositions comprising polyolefinic material having an improved dye receptivity.

Polyolefinic materials are well known articles of commerce which have experienced wide acceptance in forming shaped objects and film or sheet material. The use of such materials has extended to the fiber and fabric industries, due in no small measure to their excellent soil resistance and antistatic properties. Fibers formed from polyolefinic materials, however, are difficult to dye, and, in general, resist dyeing by conventional procedures.

The approaches which have been taken to improve the dyeability of polyolefin fibers include graft polymerization with dye receptive comonomers; blending with polymers such as polyurethanes, polyamides, epoxy resins, and the like; and incorporating certain additives which are themselves capable of taking up the dyestuff or reacting with it chemically. These approaches have not been entirely adequate or practical because the auxiliary materials are generally difficult to incorporate into the polyolefin or adversely affect the formed fibers.

It has now been discovered that dye receptivity to disperse dyeing of polyolefins suitable for use in the production of fibers can be substantially improved by blending with said polyolefin minor amounts of polyethylene terephthalate and certain arylsulfonate compounds.

Accordingly, the present invention contemplates improving the dye receptivity to disperse dyes of polyolefin fibers by forming an intimate blend comprising from 51 to 95 weight percent of polyolefin, from 49 to 5 weight percent of polyethylene terephthalate and from 0.2 to 5 parts per 100 parts of total polymer (polyolefin plus polyethylene terephthalate) of certain arylsulfonamides. Preferably, such blend contains from 51 to 79 weight percent of polyolefin, from 49 to 21 weight percent polymethylene terephthalate and from 0.2 to 2.5 parts per 100 parts of total polymer of arylsulfonamide compound. Particularly preferred are polypropylene compositions modified with polyethylene terephthalate and toluenesulfonamide.

The polyolefinic materials with which the invention is concerned are polymers and copolymers of monoolefins having from 2 to 20 carbon atoms, preferably from 2 to 12 carbon atoms, said polymers having weight average molecular weights in the range of about 100,000 to about 500,000. Representative monoolefins include ethylene, propylene, 1-butene, 4-methylpentene-1, and the like.

The arylsulfonate modifiers of the invention are the toluene-sulfonamide compounds having the formula

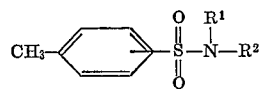

wherein $R^1$ is hydrogen, an alkyl radical having up to 8 carbon atoms, preferably up to 4 carbon atoms, or a cycloalkyl radical of 4 to 12 carbon atoms; and $R^2$ is hydrogen, an alkyl radical having up to 8, preferably up to 4, carbon atoms, a cycloalkyl radical of 4 to 12 carbon atoms or phenyl. Exemplary of such toluene sulfonamides are 6-, m-, and p-toluenesulfonamide; N-ethyl-p-toluenesulfonamide, N-cyclohexyl - p - toluenesulfonamide and N-phenyl-p-toluenesulfonamide. Mixtures of two or more of such toluenesulfonamides can be employed if desired.

The polyester component of the novel blends of this invention comprise the fiber-forming condensation product of terephthalic acid and ethylene glycol. Such polyesters will generally have a weight average molecular weight in the range of about 10,000 to about 25,000.

The improved compositions of this invention are blends and can be prepared by mixing the solid polymers in conventional mixing equipment such as dough mixers, roll mixers, or Banbury mixers; by extrusion, or by fluxing the solid polymers. If desired, solution mixing can be used by proper selection of solvents. During the blending procedure, antioxidants, stabilizers, delusterants and other known additives can be added to the compositions.

The blends of this invention produce fibers which are readily dyed by disperse dyestuffs and exhibit improved color fastness. By comparison, polyolefin fibers are only difficultly dyed with such dyestuffs and have a lower order of fastness.

Fibers can be spun from the compositions of the invention by conventional spinning techniques. For example, the compositions can be melt spun or solution spun and the filaments can then be stretched to orient the molecules and develop the desired tensile properties in the fibers. The fibers produced from the compositions of this invention can be employed in the many applications in which synthetic fibers are used and are particularly suited for use in the manufacture of carpets. The fibers of the invention are more readily dyed by conventional dyeing techniques to shades which are much deeper than have heretofore been obtainable on polypropylene fibers.

The compositions of this invention are readily extrudable by conventional procedures to produce fibers having an improved affinity for disperse dyes and exhibit excellent wash fastness, crock fastness, and gas fading fastness properties. This was entirely unexpected in view of the poorness of these properties in polyolefin fibers heretofore known.

The following example illustrates the invention.

EXAMPLE

In a series of runs, blends are prepared by mixing 65 parts of polypropylene and 35 parts of poleythylene terepthalate. To the blend is added the arylsulfonamide dye receptivity promoter of the invention. The resulting blend composition is melt spun into a fiber and knit into a flat piece. The knitted flat piece is dyed with Genacron Blue disperse dye, using a 50:1 dye bath ratio, with the bath containing about 2 percent by weight of a 20 percent solution of a nonionic surfactant and 2 percent of the dye, based on the weight of the fabric (OWF). The dyeing is carried out for 60 minutes at the boil and the fabric is rinsed thoroughly and dried. The results of the dyeing are reported in Table I.

The amount of dye on the fiber is compared with control dyeings by determination of the $K/S$ value, obtained from the reflectance of the dyed samples. Reflectance of the blue disperse dyed samples is determined with a Colormaster Colorimeter at 620 m$\mu$. The larger the $K/S$ value, the deeper the shade, e.g., a $K/S$ value of 10 indicates that the shade is approximately twice as deep as the shade having a $K/S$ value of 5. The determination of the $K/S$ values is set forth in an article by D. B. Judd, "Color in Business," Science and Industry, 1952, pages 314–342.

TABLE I

| Arylsulfonamide | Amount of p.h.p.[1] | K/S at 620mμ |
|---|---|---|
| Control.... None | 0 | 8.50 |
| Run: | | |
| 1....... o-, p-toluene sulfonamide | 2 | 10.18 |
| 2.............do | 5 | 15.14 |
| 3.....  N-ethyl-p-toluene sulfonamide | 2 | 10.93 |
| 4.............do | 5 | 9.42 |
| 5.............do | 10 | 9.55 |

[1] Parts per hundred parts of polymer, by weight.

The example demonstrates the improved dye receptivity of polyolefin compositions prepared according to the invention.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A composition of matter comprising from 95 to 51 parts by weight of a polymer or copolymer of alpha-olefins having 2 to 20 carbon atoms; from 5 to 49 parts by weight of polyethylene terephthalate; and from 0.2 to 5 parts by weight per 100 parts by weight of total polymer of at least one arylsulfonamide compound having the formula

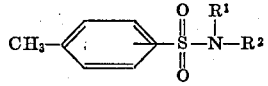

wherein $R^1$ is hydrogen, an alkyl radical having up to 8 carbon atoms, or a cycloalkyl radical of 4 to 12 carbon atoms and $R^2$ is hydrogen, an alkyl radical having up to 8 carbon atoms, a cycloalkyl radical of 4 to 12 carbon atoms or phenyl.

2. A composition of matter according to claim 1 comprising from 79 to 51 parts by weight of said polymer or copolymer and from 21 to 49 parts by weight of polyethylene terephthalate.

3. A composition of matter according to claim 2 wherein the amount of said arylsulfonamide compound is in the range of 0.2 to 2.5 parts per 100 parts of total polymer.

4. A composition of matter according to claim 2 wherein $R^1$ is hydrogen and $R^2$ is hydrogen or an alkyl radical having up to 4 carbon atoms.

5. A composition of matter according to claim 3 wherein said polymer or copolymer is polypropylene.

6. A composition according to claim 5 wherein said arylsulfonamide compound is N-ethyl-p-toluenesulfonamide.

7. A composition of matter according to claim 5 wherein said arylsulfonamide compound is a mixture of o-toluenesulfonamide and p-toluenesulfonamide.

8. A fiber of the composition of claim 1.

9. A fiber of the composition of claim 7.

10. The method of improving dye receptivity to disperse dyestuffs of a polymer or copolymer of monoolefins having from 2 to 20 carbon atoms comprising forming an intimate blend of from 51 to 95 weight percent of said polymer or copolymer, from 5 to 49 weight percent of polyethylene terephthalate, and from 0.2 to 5 parts by weight per 100 parts of total polymer of at least one arylsulfonamide having the formula

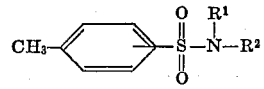

wherein $R^1$ is hydrogen, an alkyl radical having up to 8 carbon atoms, or a cycloalkyl radical of 4 to 12 carbon atoms and $R^2$ is hydrogen, an alkyl radical having up to 8 carbon atoms, a cycloalkyl radical of 4 to 12 carbon atoms or phenyl.

11. The method of claim 10 wherein the amount of said polymer or copolymer is in the range of 51 to 79 weight percent and the amount of polyethylene terephthalate is in the range of 21 to 49 weight percent.

12. The method of claim 11 wherein the amount of arylsulfonamide compound is in the range of 0.2 to 2.5 parts per 100 parts of total polymer.

13. The method of claim 11 wherein $R^1$ is hydrogen and $R^2$ is hydrogen or an alkyl radical having up to 4 carbon atoms.

14. The method of claim 12 wherein said polymer or copolymer is polypropylene.

15. The method of claim 14 wherein said arylsulfonamide compound is a mixture of o-toluenesulfonamide and p-toluensulfonamide.

16. The method of claim 14 wherein said arylsulfonamide compound is N-ethyl-p-toluenesulfonamide.

References Cited

UNITED STATES PATENTS 3,170,004   2/1965   Farago _____ 8—Dig. 9
3,359,235  12/1967   Brignac et al. _____ 260—45.75

OTHER REFERENCES

Chem. Abstract, 79573z, vol. 68, Yamamoto et al. (1965); "Polyolefin Fibers Having Good Dye Receptivity."

WILLIAM H. SHORT, Primary Examiner

E. WOODBERRY, Assistant Examiner

U.S. Cl. X.R.

8—166.3